US006172639B1

(12) United States Patent
McDonald

(10) Patent No.: US 6,172,639 B1
(45) Date of Patent: Jan. 9, 2001

(54) SIGNAL STRUCTURE AND PROCESSING TECHNIQUE FOR PROVIDING HIGHLY PRECISE POSITION, VELOCITY, TIME AND ATTITUDE INFORMATION WITH PARTICULAR APPLICATION TO NAVIGATION SATELLITE SYSTEMS INCLUDING GPS

(76) Inventor: Keith D. McDonald, 6134 Beachway Dr., Falls Church, VA (US) 22041

( * ) Notice: Under 35 U.S.C. 154(b), the term of this patent shall be extended for 0 days.

(21) Appl. No.: 09/302,365

(22) Filed: Apr. 30, 1999

Related U.S. Application Data

(60) Provisional application No. 60/083,674, filed on Apr. 30, 1998, and provisional application No. 60/098,177, filed on Aug. 26, 1998.

(51) Int. Cl.[7] .................................................. H04B 7/185
(52) U.S. Cl. ................................ 342/357.06; 342/357.01; 342/461
(58) Field of Search ......................... 342/357.01, 357.04, 342/357.06, 104, 461; 701/213

(56) References Cited

PUBLICATIONS

Keith McDonald, "GPS Civil Modernization Activity", ION Newsletter, Mar. 6, 1998.
Keith McDonald, "Technology, Implementation and Policy Concerns for a Future GNSS," Geomatics Info Magazine, Feb., 1998, pp. 30–33.

McDonald, Keith D., "GPS Civil Modernization Activity," ION Newsletter, Mar. 6, 1998.

McDonald, Keith D., "Technology, Implementation and Policy Concerns for a Future GNSS," Geomatics Info Magazine, Feb. 1988, pp. 30–33.

McDonald, Keith D., "The GPS Modernization Dilemma and Some Topics for Resolution", The Institute of Navigation Newsletter, vol. 8, No. 2, Summer 1998.

McDonald, Keith D., Technology, Implementation and Policy Issues for the Modernisation of GPS and its Role in a GNSS, The Journal of Navigation, vol. 51, No. 3, Sep. 1998.

Primary Examiner—Thomas H. Tarcza
Assistant Examiner—Dao L. Phan
(74) Attorney, Agent, or Firm—Blank Rome Comisky & McCauley LLP

(57) ABSTRACT

In a GPS or similar radionavigation signal, a pair of coarse/acquisition signals are located at, near or toward the nulls of the precision/encrypted codes in the L1 band, the L2 band or both. The resulting difference in frequency provides a very wide lane capability. The existing centered coarse/acquisition signal can be retained for legacy purposes. When a receiver receives such signals, it first determines position (speed, time, attitude, etc.) in accordance with the signals having the smallest frequency difference and thus the widest lane and then proceeds to each narrower lane to refine the accuracy of the determination.

26 Claims, 6 Drawing Sheets

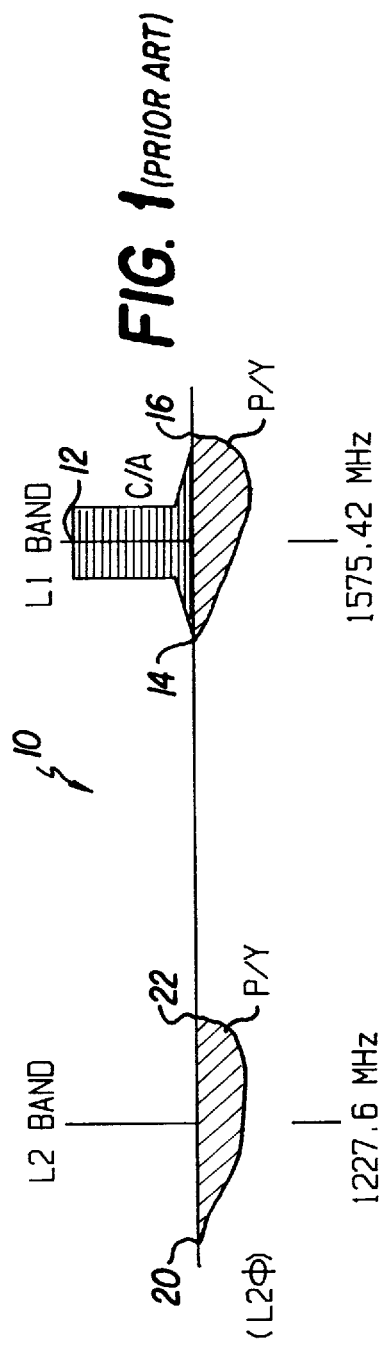
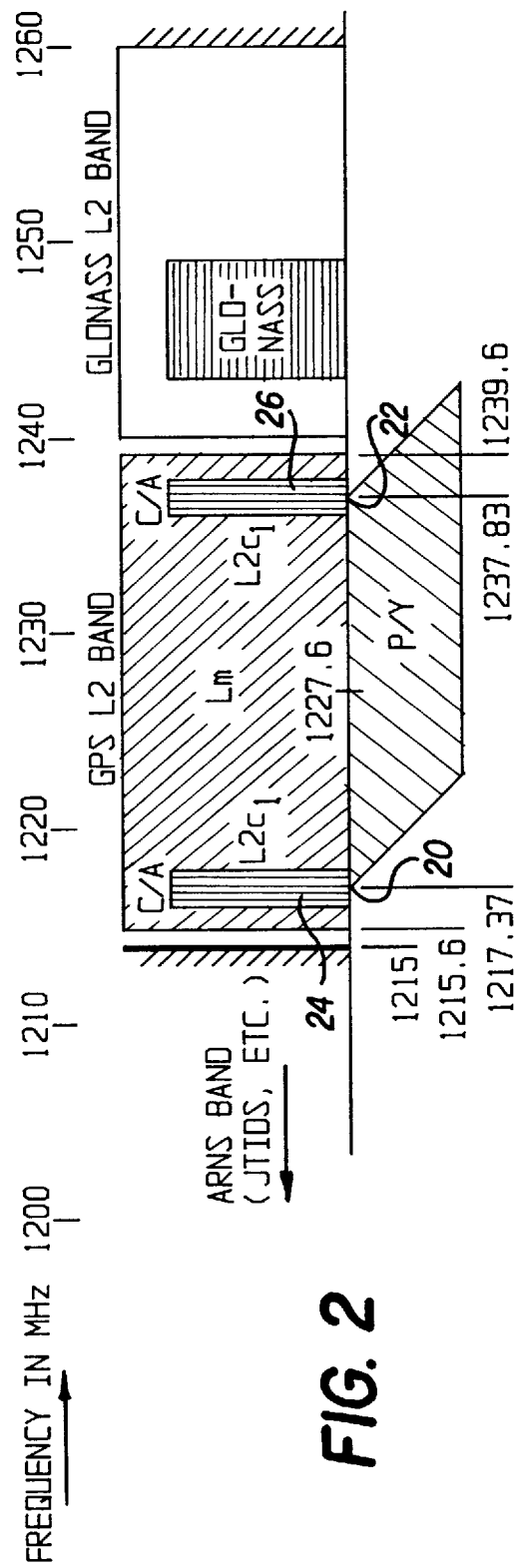

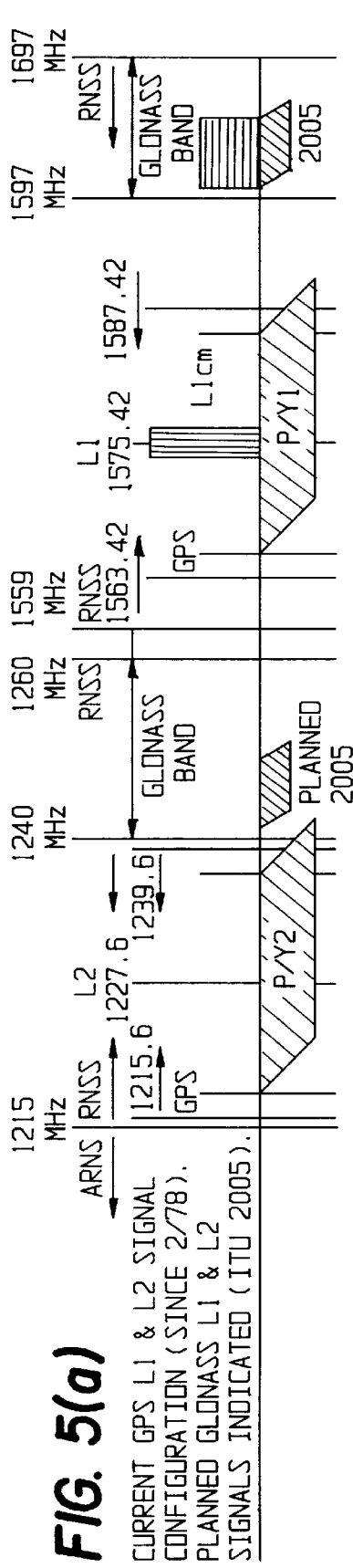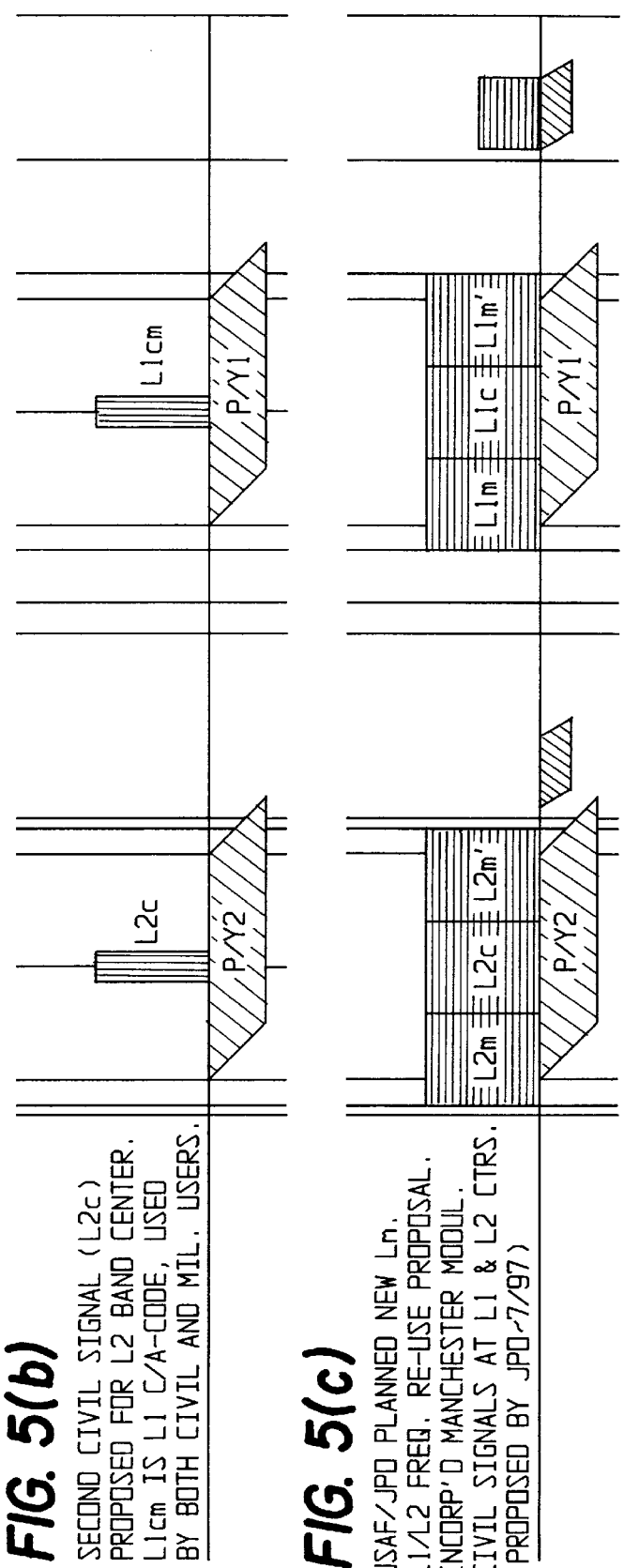
FIG. 5(a) CURRENT GPS L1 & L2 SIGNAL CONFIGURATION (SINCE 2/78). PLANNED GLONASS L1 & L2 SIGNALS INDICATED (ITU 2005).
FIG. 5(b) SECOND CIVIL SIGNAL (L2c) PROPOSED FOR L2 BAND CENTER. L1cm IS L1 C/A-CODE, USED BY BOTH CIVIL AND MIL. USERS.
FIG. 5(c) USAF/JPO PLANNED NEW L1, L1/L2 FREQ. RE-USE PROPOSAL. INCORP'D MANCHESTER MODUL. CIVIL SIGNALS AT L1 & L2 CTRS. (PROPOSED BY JPO-7/97)

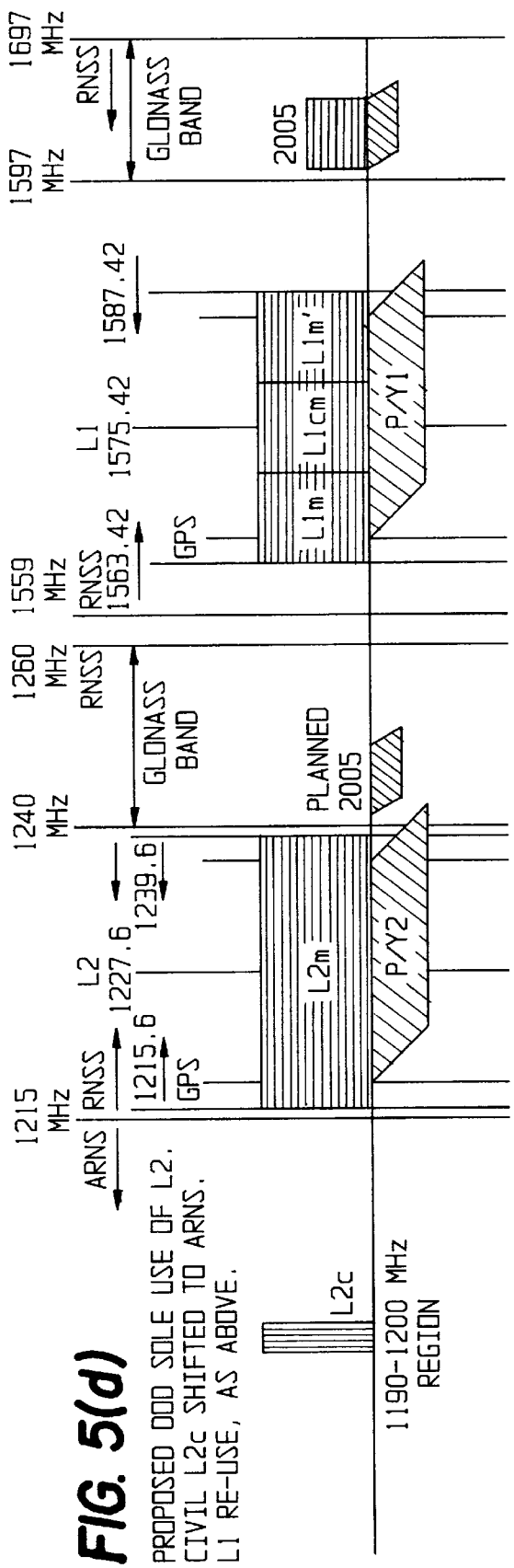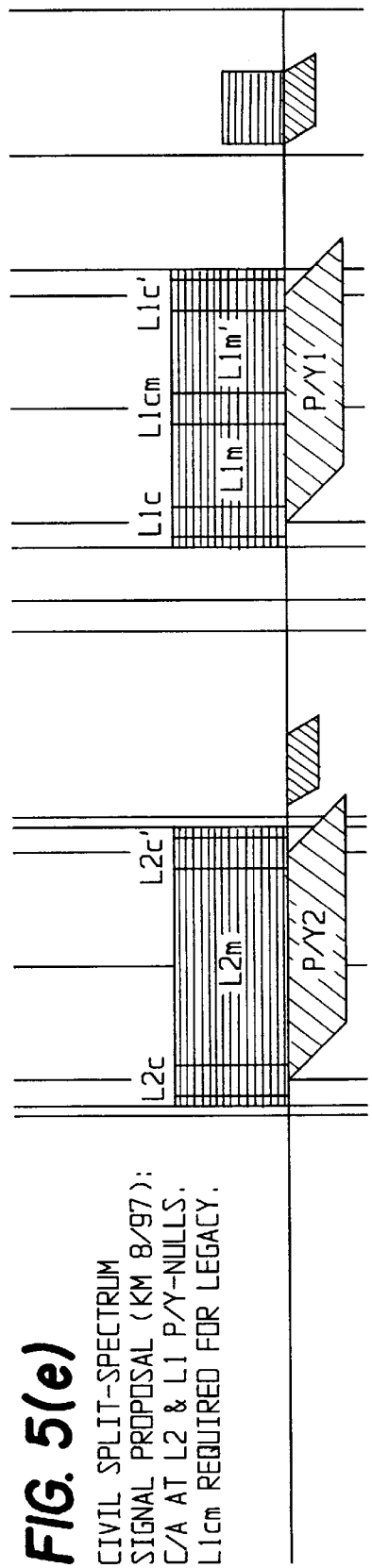
FIG. 5(d)
PROPOSED DOD SOLE USE OF L2.
CIVIL L2c SHIFTED TO ARNS.
L1 RE-USE, AS ABOVE.
FIG. 5(e)
CIVIL SPLIT-SPECTRUM
SIGNAL PROPOSAL (KM 8/97):
C/A AT L2 & L1 P/Y-NULLS.
L1cm REQUIRED FOR LEGACY.

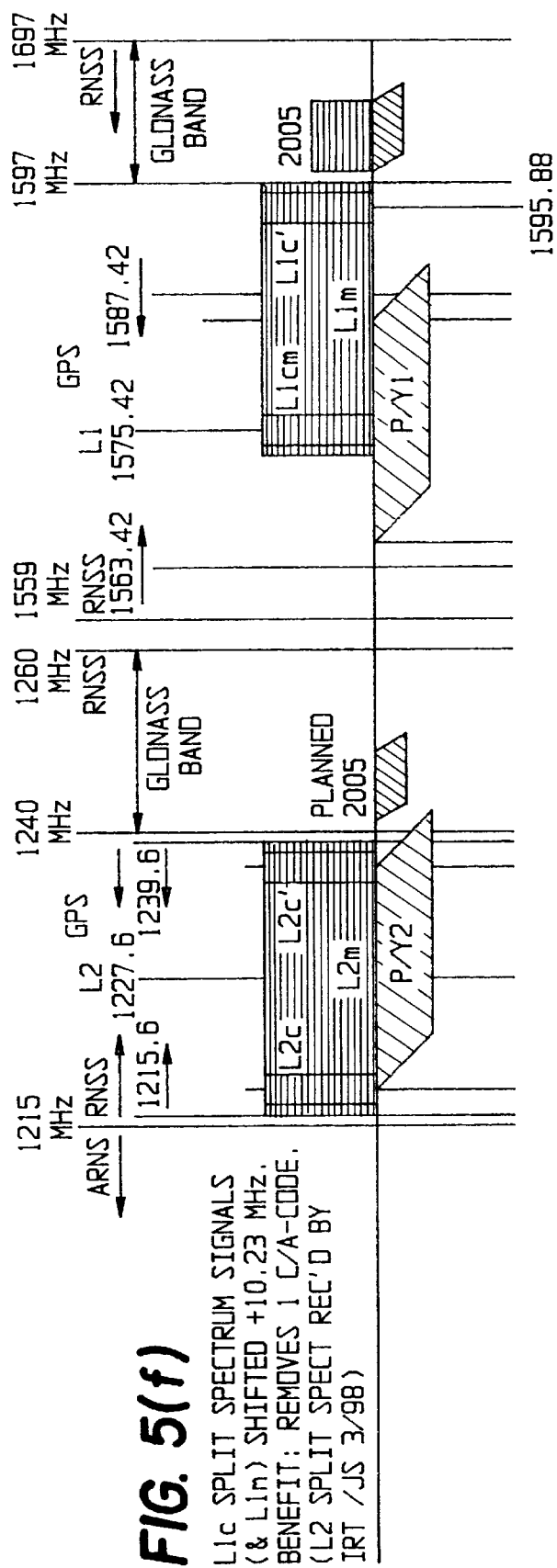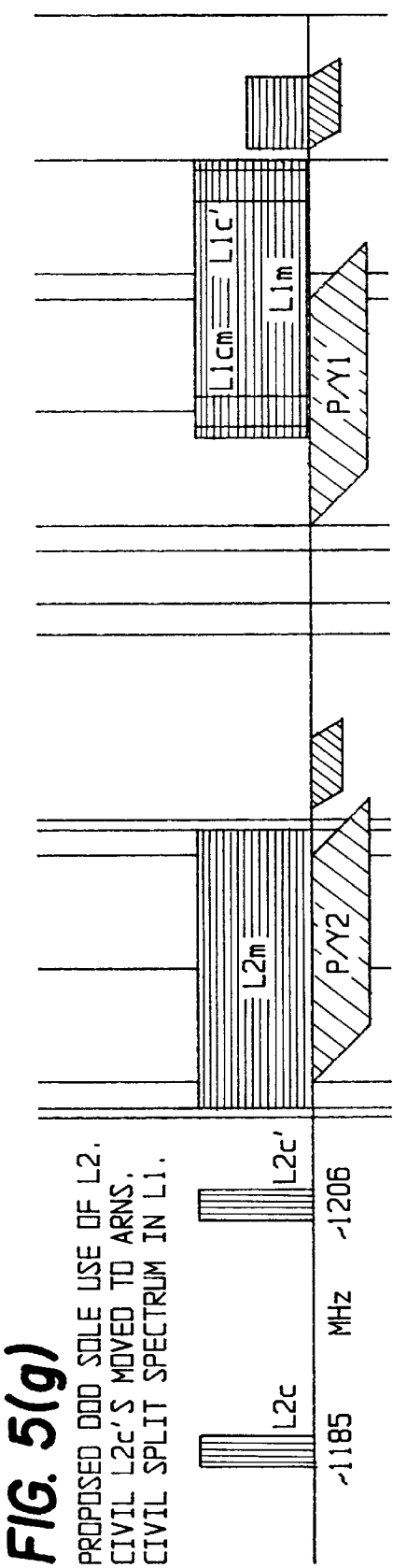

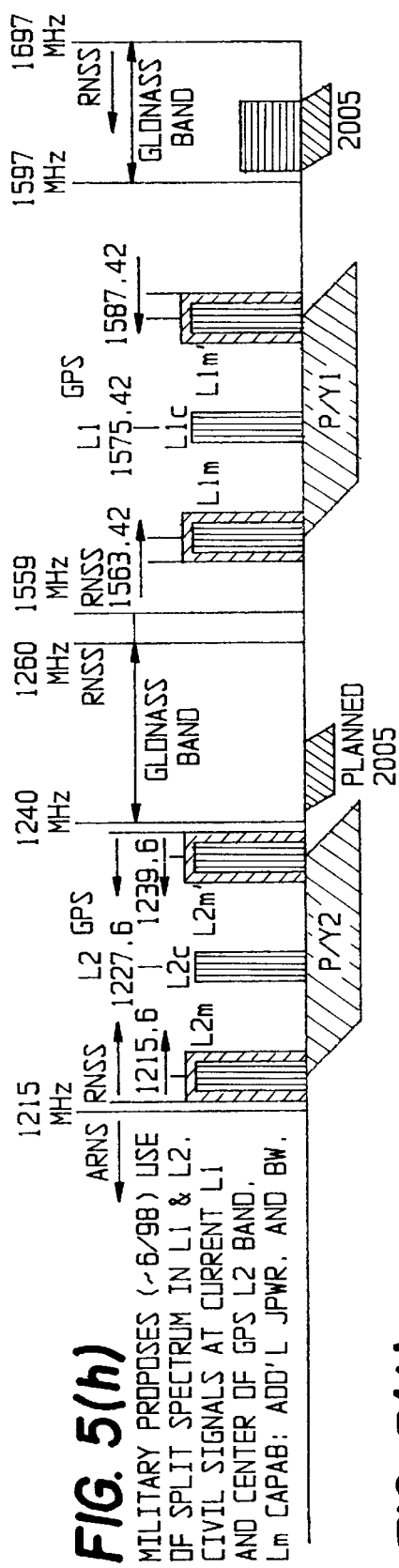
FIG. 5(h) MILITARY PROPOSES (~6/98) USE OF SPLIT SPECTRUM IN L1 & L2. CIVIL SIGNALS AT CURRENT L1 AND CENTER OF GPS L2 BAND. Lm CAPAB: ADD'L JPWR. AND BW.
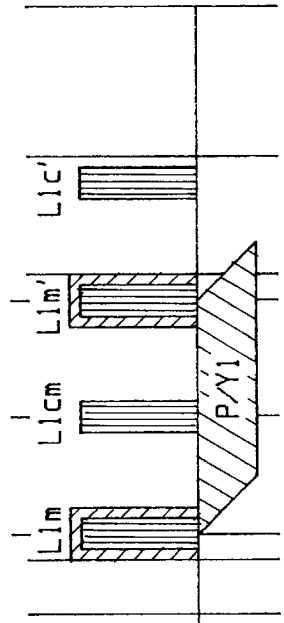
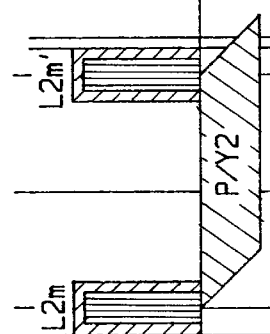
FIG. 5(j) PROPOSED DOD SOLE USE OF L2. CIVIL L2 SIGNAL IN ARNS BAND. L1c' AT L1c+20.46 MHz.
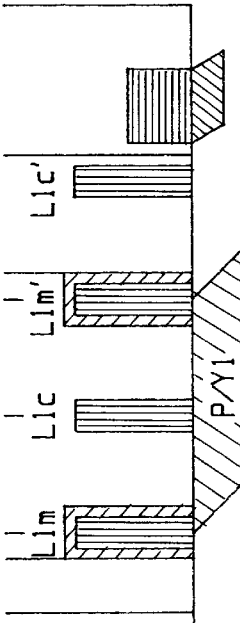
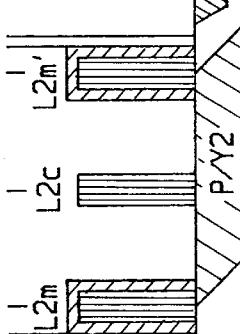
FIG. 5(k) CIVIL L1c'=L1c+20.46 MHz. CIVIL L2c AT GPS L2 CENTER. CIVIL L3 IN ARNS BAND L3=L2c−30.69 MHz.

US 6,172,639 B1

SIGNAL STRUCTURE AND PROCESSING TECHNIQUE FOR PROVIDING HIGHLY PRECISE POSITION, VELOCITY, TIME AND ATTITUDE INFORMATION WITH PARTICULAR APPLICATION TO NAVIGATION SATELLITE SYSTEMS INCLUDING GPS

REFERENCE TO RELATED APPLICATION

This application claims the benefit of U.S. Provisional Application Nos. 60/083,674, filed Apr. 30, 1998, and 60/098,177, filed Aug. 26, 1998. The disclosures of both of the provisional applications are hereby incorporated by reference in their entireties into the present disclosure.

FIELD OF THE INVENTION

The present invention is directed to obtaining highly precise position, velocity, time and attitude measurements by the use and processing of multiple signals separated in frequency and their sum and difference measurements. One application is in the resolution of the integer cycle ambiguities associated with precise carrier phase measurements of the signals used in satellite navigation systems such as the U.S. Global Positioning Satellite (GPS) System or the Russian Global Orbiting Navigation Satellite System (GLONASS), or other systems. The use of dual or "split spectrum" signals in one or more bands assigned to GPS, GLONASS or other systems provides substantial performance improvements over current implementations. This approach, which can be implemented in various configurations, provides significant system performance improvements including improvements in accuracy, integrity, availability and continuity.

BACKGROUND OF THE INVENTION

Both the United States and the Russian Federation have established orbiting satellite navigation systems, and the Europeans are planning a system. The GPS system and the GLONASS system each employ a constellation of orbiting satellites which provide signals to receivers on the earth (ground, airborne, marine) and in space which are used to determine precise three-dimensional positions and time (e.g., latitude, longitude, altitude, time). Such signals can be used, for example, for navigation, surveying, timing, positioning and for measuring dimensional and time changes. Both the GPS and GLONASS systems each use two separated bands of frequencies in the L-band portion of the electromagnetic spectrum which have been allocated for radionavigation satellite services by the International Telecommunication Union (ITU).

In the case of both the GPS system and the GLONASS system, the frequency bands are designated L1 for the higher frequency band and L2 for the lower frequency band. A detailed description of the signal structure used for the GPS system is provided in Kayton, M. and W. R. Fried, Avionics Navigation Systems, 2d Ed., Chapter V, Satellite Radionavigation by A. J. Van Dierendonck, Section 5.5.5 GPS Signal Structure, pp. 213–282, John Wiley and Sons, Inc., New York, N.Y., 1997, which description is hereby incorporated by reference herein.

Referring to the drawings, FIG. 1 shows the existing GPS signal structure, generally designated by reference numeral 10. In FIG. 1, C/A designates the existing GPS coarse/acquisition code modulation on the L1 carrier, while P/Y indicates the GPS precise/encrypted code modulation of the L1 and L2 carriers, and L2φ indicates the "carrier phase" part of the P/Y-code signal at L2 that is authorized for civil use (for ionospheric correction).

For the L1 band, the signal energy of the C/A-code is concentrated at the center of the bands 12, with very little C/A-code energy at or near the P/Y-code nulls 14,16. For the L2 band, there is no C/A-code signal centered in the band 18 and no C/A-coded signal at or near the P/Y-code nulls 20,22.

Throughout the drawings, the frequency occupancies of the bands (to their first spectral nulls) are shown, not the shape of the waveform, or signal power distribution, of each band. Those skilled in the art who have reviewed the present disclosure will readily appreciate the waveform shape in each situation.

Known systems have the following drawbacks. First, accuracy is normally to within several meters; accuracy to within centimeters or decimeters adds considerable cost and complexity and is reliably achieved only by the use of differential measurements of the carrier phases of the received signals. One problem in achieving high accuracy is the problem of resolving the integer wavelength ambiguity associated with the carrier phase measurements. Second, modulations provided for civilian and military uses have maxima near one another (or collocated in frequency), which is undesirable for some military purposes.

SUMMARY OF THE INVENTION

It is therefore an object of the invention to improve accuracy at a moderate cost.

It is a further object of the invention to separate the signals available for civilian use from the maxima of the signals for military use. This can be accomplished by (a) moving the civil signals away from the center of the band if the planned military signals (Lm) are to occupy the center of the band, or (b) moving the planned military signals away from the center of the band if the existing and planned civil signals are to be in the center of the bands. While the first option will be disclosed in detail, either can be used.

To achieve the above and other objects, the present invention improves position, velocity, time and attitude determinations using radionavigation satellite signals by the use of a new signal structure which provides a number of features including means for rapidly and accurately resolving the carrier cycle integer ambiguities in the use of the signals for carrier phase measurement applications. Specifically, for the use with GPS signals (and applicable to GLONASS and other signals), the existing signal structure for either the L1 band or the L2 band, or both, is modified to use dual signals by locating a pair of GPS coded signals (such as coarse/acquisition, or C/A, signals, or other coded signals) at, or near - (within several MHz of), the P/Y-code nulls. The P/Y-code nulls refer to the GPS (or GLONASS) precision coded (P-code) signals, with bit rates of 10.23 Mbps for GPS and 5.11 Mbps for GLONASS. The Y-code is the encrypted GPS P-code, at the P-code bit rate. The first nulls of these codes occur at a frequency offset above and below their carrier center frequencies by the code bit (or "chipping") rate and thereby constitute a first lower null and a first upper null. In the case of the L2 band, a first coded signal could be located near (or at) the frequency corresponding to the lower P/Y-code null and a second coded signal could be located near (or at) the frequency corresponding to the upper P/Y-code null. In the case of the L1 band, a third coded signal could be located near (or at) the frequency corresponding to the lower P/Y-code null and a fourth coded signal could be located near (or at) the frequency corresponding to the upper P/Y-code null. Permanently, or for a transitional period in this exemplary configuration, a coded signal could also be located (or retained) at the carrier frequency corresponding to the current C/A code of the GPS signal in the L1 band, for backward compatibility purposes.

The present invention offers the advantage of permitting GPS and other users to obtain accurate position, velocity, time, attitude and other information, from measurements obtained between a user and a set of spacecraft emitters (such as GPS satellites), or other emitters, including ground-based emitters. These measurements are of range, range difference, range rate (singly or in combination), differential carrier phase and phase differences, using three or more separate signals operating at differing frequencies such that the signals, their sum and difference signal frequencies, their differential carrier phases and their phase differences provide ranging and other information which provides a means for resolving the range, range difference, carrier phase and phase difference ambiguities as well as the integer cycle ambiguities associated with measurements of the relative carrier phase of the signals. The multiple frequency step-wise resolution of the differential carrier phase integer cycle ambiguities is a significant aspect of the present invention.

BRIEF DESCRIPTION OF THE DRAWINGS

FIG. 1 is a schematic diagram of the present signal structure and band occupancy associated with the GPS radionavigation satellite system.

FIG. 2 is a schematic diagram of the general signal structure of the present invention as applied to the L2 band of the GPS radionavigation satellite system. This movement of coded signals away from the center of the band could represent either civil or military signals.

FIGS. 5(a), 5(b), 5(c), 5(d), 5(e), 5(f), 5(g), 5(h), 5(j) and 5(k) are schematic diagrams showing candidate civil and military signal configurations.

DETAILED DESCRIPTION OF THE PREFERRED EMBODIMENTS

Figure 3:
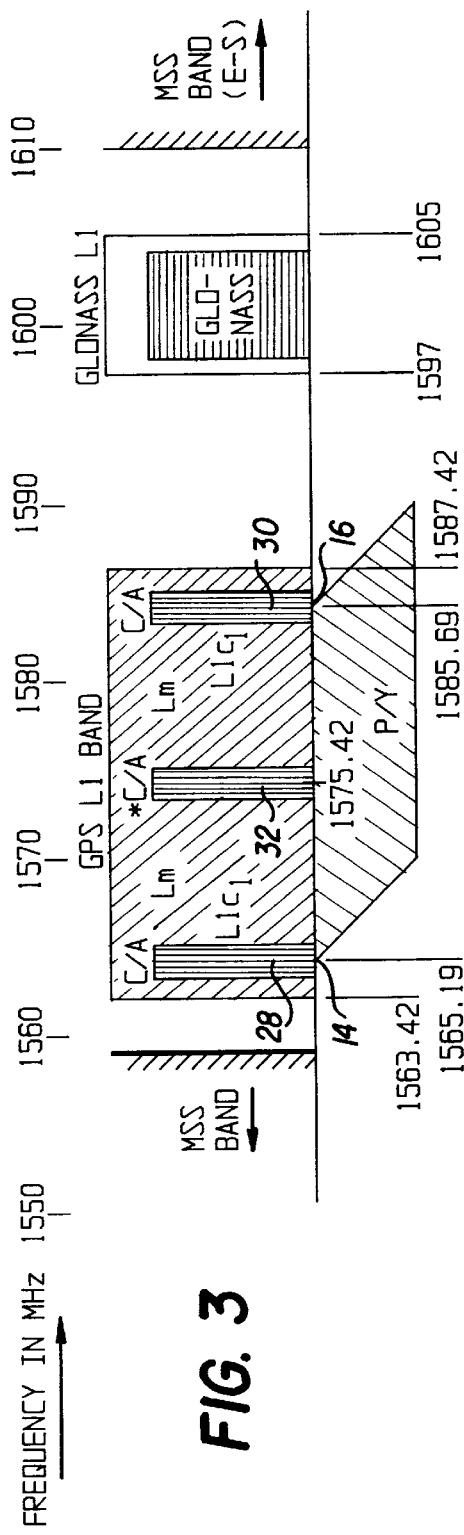
FIG. 3 is a schematic diagram of the signal structure of the present invention as applied to the L1 band of the GPS radionavigation satellite system. Although the diagram addresses the movement of civil signals (e.g., C/A coded signals), the technique is equally applicable to the movement of the planned military signals.

Preferred embodiments will now be set forth in detail with reference to the drawings, in which like reference numerals or alphanumeric designations indicate like features throughout. Referring to FIG. 2, a pair of coded civil signals 24,26 (C/A-code or other) is placed at, or near, the P/Y-code nulls 20,22 of the GPS bands, as is shown for the dual signals 24,26 in the L2 band. In FIG. 2, Lm indicates the military link signal, ARNS indicates the band for aeronautical radionavigation services, and JTIDS indicates frequencies usable for the DoD Joint Tactical Information Distribution System.

Similarly, referring to FIG. 3, a pair of coded civil signals 28,30 (e.g., C/A-code) are placed at or near the P/Y-code nulls 14,16 of the L1 band. The existing centered C/A signal is designated by element numeral 32. MSS identifies the band for mobile satellite services (below 1559 MHz and 1610–1626.5 MHz).

A principal advantage of the arrangement of FIGS. 2 and 3 is that the pair of coded civil signals (C/A-coded, or a variant) provides a "very wide lane" capability by using the 20.46 MHz difference in frequency (e.g., the 20.46 MHz separation) between the coded signals to provide a very wide lane, in this case about 14.7 meters. This very wide lane, used in combination with the current L1/L2 wide lane (86 cm, resulting from the difference in frequency between L1 and L2 of 357.82 MHz) or with other multiple signal measurement techniques, provides highly advantageous capabilities for determining accurate precise position, velocity and time (PVT) and related performance enhancements to GPS (and similarly to GLONASS). This technique can be used for real time operations or on a post processed basis to obtain unambiguous decimeter to mm values of precise position; nmm/sec. or better values of velocity; nsec values of time and similar precision in attitude measurements (50–100 $\mu$Radian). The dual (or split spectrum) signal arrangement also provides improved signal integrity, availability and continuity features. This arrangement is especially important and beneficial in the L2 band since this frequency band is not "protected" internationally by ITU agreement. The GPS operations in the L2 band are co-primary with radiolocation systems that include many radar systems with emissions that may interfere with GPS signals in the L2 band. With dual signals, it is highly unlikely that a radar signal would simultaneously interfere with two GPS signals separated by about 10–20 MHz. Therefore, the probability or confidence level, of having access to at least one of the two L2 band signals would be very high. Implementation of the dual signal arrangement in the L1 band also provides highly desirable capabilities. Since this band is protected by the ITU regulations, the L1 band provides a very high level of availability for (both) of the dual signals in the L1 band. It is use of the dual signals which ensures rapid and reliable determination of the carrier phase integer ambiguities, thereby assuring rapid, unambiguous, accurate determinations of position, velocity, time, attitude and changes in these parameters.

The dual signal arrangement also avoids the degradation effects (termed fratricide by the DoD) on the military P/Y-code "legacy" (backward compatibility) signal in the event that the civil signals (e.g., the C/A-coded signals) need to be denied to an adversary. Placing the signals at, or toward, the extremities of the assigned GPS band(s) also provides increased flexibility to the DoD in its selection of a new military signal, DOD has called Lm. The new Lm can occupy the entire band, as is the case now with the military P/Y-coded signals. This centering of the Lm signal in the bands is the guidance originally provided to the civil community.

The dual signal concept of the present invention requires alteration of existing GPS agreements, procedures and future spacecraft. Among these alterations are the additional spacecraft power required for the additional coded civil signals (possible in each band) and the somewhat greater burden placed on the DoD to deny an adversary access to the signals. The paired signal or split spectrum approach is also appropriate for implementation in the current GPS L2 band as the "second coded civil signal" and may satisfy stated DoD and DoT requirements. However, those skilled in the art who have reviewed the present disclosure will readily appreciate the required modifications to hardware and software.

Figure 4:
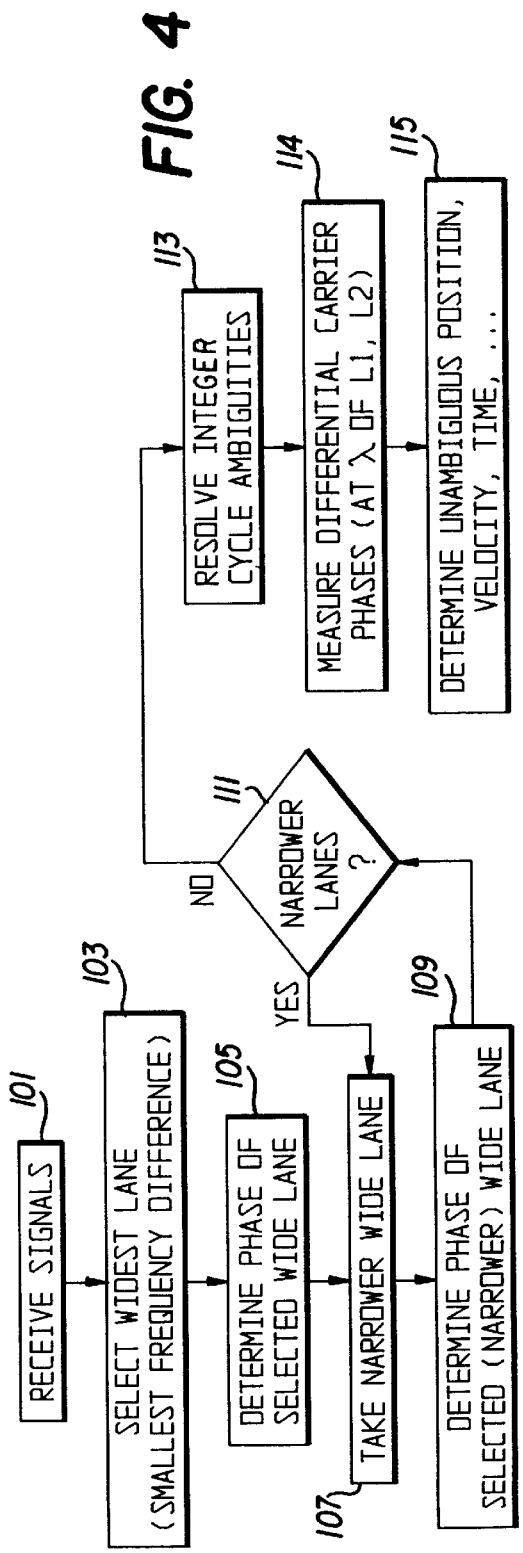
FIG. 4 is a flow chart showing a sequence of operations which a receiver can perform upon receipt of a signal structure such as that shown in FIG. 2 or FIG. 3.

Although those skilled in the art will also readily appreciate the manner in which a signal such as that of FIG. 2 or 3 is to be used, an overview of a particular procedure will be set forth with reference to the flow chart of FIG. 4. In step 101, a receiver receives signals emitted from satellites, ground transmitters, or the like. In step 103, the receiver takes the widest lane, which corresponds to the smallest frequency difference between signals, as wavelength and frequency vary inversely. The inverse variation results from the relationship between wavelength and frequency, which is well known from basic physics. That is, wavelength and frequency are inversely proportional to each other, with the proportionality constant being c, the speed of light. As a result, if $\Delta f$ is the frequency difference between signals, the corresponding wavelength $\lambda$ is given by $\lambda = c/\Delta f$. In step 105, the receiver determines the differential phase of the widest lane; step 105 can be carried out in accordance with known techniques. In step 107, a narrower lane (larger frequency difference) is taken, and in step 109, the phase of that narrower lane is resolved. If it is determined in step 111 that still narrower lanes (larger frequency differences) have yet to be considered, steps 107 and 109 are repeated until all lanes from the widest to the narrowest have been considered, at which time the integer cycle ambiguities can be resolved in step 113. The phase of each lane except the narrowest allows a resolution of the next narrower lane and in particular of the integer wavelength ambiguity of that next narrower lane, while the phase of the narrowest lane allows a resolution of the integer cycle ambiguities of the differential phase measurements. For example, the use of four C/A-coded signals, one in the L1 band and the other in the L2 band, provides up to six lane widths. Step 114 provides a measurement of the carrier phases associated with the measurement signal (e.g., L1 or L2). Step 115 determines the precise position, velocity, time or other parameter using the phase measurements.

Thanks to the process just described, the 14.7 meter wide lane associated with a 20.46 MHz separation provides some significant advantages. This would allow users with rudimentary code differential capabilities (now at the 1–5 m. level), to determine quickly the correct integer wavelength of the 14.7 meter wide-lane signal. A moderate accuracy phase measurement (3–5 degrees) of the 14.7 m. wide-lane provides for a simple, reliable and rapid determination of the 86 cm L1/L2 wide-lane, and then an even more coarse phase measurement of that 86 cm lane provides an accurate resolution of the 19 cm L1 (and/or the 24.4 cm L2) carrier wavelength. This step-wise determination of the unambiguous carrier phase provides information that then can be used in the conventional determination of position from the L1 carrier phase measurements. This straightforward process provides the user with real time decimeter to centimeter accuracy without the need for sophisticated, costly software, as is now required.

Many of the signal advantages of the present invention (excellent accuracy, very low multipath, rapid reacquisition, etc.) would benefit aviation users. A listing of many of the features of this technique will now be set forth:

- A difference frequency between L2c's of 20.46 MHz forms a very wide lane of~14.7 meters.
- Reliable access to a 14.7 m VWL (very wide lane) is provided by SPS (after SA) or code DGPS.
- Phase measurement (~1–2%) of the VWL resolves the L1c/L2c (86 cm) wide lane (WL) cycle.
- Phase measurement (~3–6%) of the WL (86 cm) resolves a 19 cm L1c carrier cycle to cm, mm.
- Phase of 19 cm cycle gives cm, mm precision ranges for GPS solution with 4+ spacecraft (S/C).
- No requirement for ambiguity resolution algorithms employing redundant S/C.
- Differencing techniques can determine S/C and receiver unknown (unmodeled) bias errors.
- Progressive VWL to WL to carrier technique gives real time PVT accuracy to cm, mm/s and ns.
- System can operate with use of DGPS carrier phase corrections from earth reference, or operates autonomously based on S/C system position accuracy (~5–20 cm by 2005).
- Data link feasible on both L2c (and/or both L1c) transmissions; at about 50 bps on each.
- L2c and L1c DL's can carry DGPS and site data, tropo data, integrity, S/C biases, alerts, etc.
- L2c and L1c transmissions can use C/A codes or more narrow-band signals if desired.
- Progressive wide laning carrier phase technique reduces multipath to a very low level (a few cm).
- Improved ionospheric correction obtained from higher precision measurements at L1 and L2.
- L1c dual signals provide VWL and DL; provides improved signal availability and integrity.
- L1c/L2c signal pairs provide ~86 cm wide lanes and ionospheric correction information.
- L1c dual signals in ITU protected L1 band: robust, available, high-integrity signals for safety.
- Technique provides useful, high-performance signals near ends of bands; efficient use of spectrum.
- Very wide lanes used for rapid, reliable acquisition; system robust under signal loss conditions.
- Signal arrangement compatible with techniques for obtaining improved code performance.
- Technique provides a practical method for satisfying current and future GPS performance needs.

Since the L2 band is not protected, some aviation authorities state that the use of the L2 band could jeopardize safety-of-life applications unless the band is used exclusively for radionavigation satellite operations. The increased single signal availability of the dual signal arrangement in the L2 band may substantially mitigate these concerns. The L1 band is protected by ITU regulations and is being used by the FAA and other aviation authorities. The dual signals in the L1 band provide the rapid and reliable capabilities described for the invention and offers substantial advantages to future users in many safety critical and other applications. If a dual C/A-code signal in the L1 band is to replace the currently available centered C/A-code signal, a transitional period appears required.

While the GPS signal structure is specifically described and shown, it is contemplated that the invention is applicable to providing signals at or near the nulls of the GLONASS system and is applicable to possibly other systems.

The frequency separation between the split spectrum signals is an important characteristic of the present invention. The location of the P/Y code nulls is of secondary importance. There are some practical advantages and civil-military compatibility features to the arrangements of the preferred embodiments, although such arrangements in no way influence or restrict the operation of the split-spectrum technique.

Various candidate civil and military signal configurations will now be described. FIG. 5(a) shows a current GPS L1 and L2 signal configuration used since February, 1978. Planned GLONASS L1 and L2 signals are indicated (ITU 2005). FIG. 5(b) shows a second civil signal L2c proposed for the L2 band center. L1cm is an L1 C/A code used by both civil and military users. FIG. 5(c) shows a USAF/JPO planned new Lm L1/L2 frequency re-use signal, proposed by JPO in approximately July, 1997, incorporating Manchester modulation. The civil signals are at the L1 and L2 centers. FIG. 5(d) shows a proposed DOD sole use of L2, with the civil L2c shifted to ARNS and L1 reuse as above. FIG. 5(e) shows a civil split-spectrum signal proposal by the present inventor, with C/A at the L2 and L1 P/Y nulls. L1cm is required for legacy users. FIG. 5(f) shows L1c split spectrum signals and L1m shifted +10.23 MHz. The benefit is the removal of one C/A code. FIG. 5(g) shows the proposed DOD sole use of L2, with civil L2c's moved to ARNS and the civil split spectrum in L1. FIG. 5(h) shows a military proposal from June, 1998, for the use of split spectrum in L1 and L2. The civil signals are at the current L1 and the center of the GPS L2 band. FIG. 5j) shows a proposed DOD sole use of L2. The civil L2 signals are in the ARNS band, and L1c' is at L1c+20.46 MHz. FIG. 5(k) shows a civil L1c' at L1c+20.46 MHz, civil L2c at the GPS L2 center, and the civil L3 in the ARNS band, with L3=L2c−30.69 MHz.

Although certain presently preferred embodiments of the present invention have been specifically described herein, it will be apparent to those skilled in the art to which the invention pertains that variations and modifications of the various embodiments shown and described herein may be made without departing from the spirit and scope of the invention. For example, the applicability of the present invention is not limited to GPS and GLONASS, but instead can be extended to other radionavigation systems or to other areas of endeavor. Accordingly, it is intended that the invention be limited only to the extent required by the appended claims and the applicable rules of law.

What is claimed is:

1. A signal structure embodied in a carrier wave for a position determination system, comprising:

a frequency band ranging between, and including, a lower frequency at, near or toward a first lower null point of a high rate code and an upper frequency at, near or toward a first upper null point of said high rate code;

a first coded signal located at a frequency proximate to said lower frequency;

a second coded signal located at a frequency proximate to said upper frequency;

said first and second coded signals providing a wide lane resulting from a wavelength λ corresponding to the frequency difference Δf between said first and second coded signals, λ being related to Δf by λ=c/Δf, c being the speed of light;

wherein the high rate code and a phase difference between the first and second coded signals contain information permitting the position determination system to receive the carrier wave and to determine at least one of a position, a time, a speed and an attitude in accordance with the signal structure.

2. A signal structure embodied in a carrier wave for a position determination system, comprising:

a first lower frequency band ranging between, and including, a first lower frequency at, near or toward a first lower null point of a first high rate code and a first upper frequency at, near or toward a first upper null point of said first high rate code;

a first coded signal located at a frequency proximate to said first lower frequency;

a second coded signal located at a frequency proximate to said first upper frequency;

said first and second coded signals providing a first very wide lane resulting from a wavelength λ corresponding to the frequency difference Δf between said first and second coded signals, λ being related to Δf by λ=c/Δf, c being the speed of light;

a second higher frequency band ranging between, and including, a second lower frequency at, near or toward a first lower null point of a second high rate code and a second upper frequency at, near or toward a first upper null point of said second high rate code;

a third coded signal located at a frequency proximate to said second lower frequency;

a fourth coded signal located at a frequency proximate to said second upper frequency;

said third and fourth coded signals providing a second very wide lane resulting from a wavelength corresponding to the frequency difference between said third and fourth coded signals, and said first through fourth coded signals providing additional wide lane combinations;

wherein the first and second high rate codes, a phase difference between the first and second coded signals, a phase difference between the third and fourth coded signals, and phase differences in the additional wide lane combinations contain information permitting the position determination system to receive the carrier wave and to determine at least one of a position, a time, a velocity and an attitude in accordance with the signal structure.

3. A signal structure as in claim 1, wherein the position determination system is a satellite navigation system.

4. A signal structure as in claim 2, wherein the position determination system is a satellite navigation system.

5. A signal structure as in claim 3, wherein said high rate code is a P/Y-code of a GPS navigation system signal.

6. A signal structure as in claim 4, wherein each of said first and second high rate codes is a P/Y-code of a GPS navigation system signal.

7. A signal structure as in claim 4, wherein said second higher frequency band corresponds to an L1 band for a GPS navigation system.

8. A signal structure as in claim 4, wherein said first lower frequency band corresponds to an L2 band for a GPS navigation system.

9. A signal structure as in claim 4, wherein said third coded signal is proximate to a first L1 band P/Y-code null.

10. A signal structure as in claim 4, wherein said fourth coded signal is proximate to a second L1 band P/Y-code null.

11. A signal structure as in claim 4, wherein said first coded signal is proximate to a first L2 band P/Y-code null.

12. A signal structure as in claim 4, wherein said second coded signal is proximate to a second L2 band P/Y-code null.

13. A method of making a determination of at least one of a position, a time, a speed, and an attitude, the method comprising:

(a) receiving a plurality of signals from spatially separated sources, each of the plurality of signals having at least one high rate code and at least two coded signals, the at least two coded signals having a frequency separation Δf which provides a wide lane of wavelength λ, λ being related to Δf by λ=c/Δf, c being the speed of light;

(b) obtaining a phase measurement of a phase difference between the at least two coded signals from the wide lane;

the high rate code and the phase difference containing information permitting the determination, and (c) making the determination in accordance with the high rate code and the phase measurement obtained in step (b).

14. A method as in claim 13, wherein:

said each of the plurality of signals has at least three said coded signals to provide said wide lane and at least one narrower lane; and step (b) comprises obtaining first and second phase measurements from the wide lane and the at least one narrower lane.

15. A method as in claim 13, wherein:

said at least one high rate code occupies a frequency band ranging between, and including, a lower frequency at, near or toward a first lower null point of said at least one high rate code and an upper frequency at, near or toward a first upper null point of said at least one high rate code; and said at least two coded signals comprise
  a first coded signal located at a frequency proximate to said lower frequency; and
  a second coded signal located at a frequency proximate to said upper frequency.

16. A method as in claim 14, wherein:

said at least one high rate code comprises:
  a first high rate code which occupies a first lower frequency band ranging between, and including, a first lower frequency at, near or toward a first lower null point of said first high rate code and a first upper frequency at, near or toward a first upper null point of said first high rate code; and
  a second high rate code which occupies a second higher frequency band ranging between, and including, a second lower frequency at, near or toward a first lower null point of said second high rate code and a second upper frequency at, near or toward a first upper null point of said second high rate code; and said at least three coded signals comprise:
  a first coded signal located at a frequency proximate to said first lower frequency;
  a second coded signal located at a frequency proximate to said first upper frequency;
  said first and second coded signals providing a first very wide lane resulting from a wavelength corresponding to the frequency difference between said first and second coded signals;
  a third coded signal located at a frequency proximate to said second lower frequency; and
  a fourth coded signal located at a frequency proximate to said second upper frequency;
  said third and fourth coded signals providing a second very wide lane resulting from a wavelength corresponding to the frequency difference between said third and fourth coded signals, and said first through fourth coded signals providing additional wide lane combinations.

17. A method as in claim 15, wherein the sources are part of a satellite navigation system.

18. A method in claim 16, wherein the sources are in a satellite navigation system.

19. A method as in claim 17, wherein said high rate code is a P/Y-code of a GPS navigation system signal.

20. A method as in claim 18, wherein each of said first and second high rate codes is a P/Y-code of a GPS navigation system signal.

21. A method as in claim 18, wherein said second higher frequency band corresponds to an L1 band for a GPS navigation system.

22. A method as in claim 18, wherein said first lower frequency band corresponds to an L2 band for a GPS navigation system.

23. A method as in claim 18, wherein said third coded signal is proximate to a first L1 band P/Y-code null.

24. A method as in claim 18, wherein said fourth coded signal is proximate to a second L1 band P/Y-code null.

25. A method as in claim 18, wherein said first coded signal is proximate to a first L2 band P/Y-code null.

26. A method as in claim 18, wherein said second coded signal is proximate to a second L2 band P/Y-code null.

* * * * *